US 7,421,696 B2

(12) United States Patent
Bowie-Britton (10) Patent No.: US 7,421,696 B2
(45) Date of Patent: Sep. 2, 2008

(54) METHODS AND SYSTEMS FOR MANAGING SUCCESSFUL COMPLETION OF A NETWORK OF PROCESSES

(75) Inventor: Simon Bowie-Britton, Hutton Brentwood Essex (GB)

(73) Assignee: JP Morgan Chase Bank, New York, NY (US)

( * ) Notice: Subject to any disclaimer, the term of this patent is extended or adjusted under 35 U.S.C. 154(b) by 948 days.

(21) Appl. No.: 10/779,934

(22) Filed: Feb. 17, 2004

(65) Prior Publication Data

US 2005/0137902 A1 Jun. 23, 2005

Related U.S. Application Data

(60) Provisional application No. 60/531,741, filed on Dec. 22, 2003.

(51) Int. Cl.
*G06F 9/46* (2006.01)
*G06F 15/16* (2006.01)
*G06F 7/00* (2006.01)

(52) U.S. Cl. .................. 718/106; 719/318; 709/223; 707/100

(58) Field of Classification Search ......... 718/100–108; 709/100, 223; 719/318; 707/100
See application file for complete search history.

(56) References Cited

U.S. PATENT DOCUMENTS

| 3,705,385 A | 12/1972 | Batz |
| 3,860,870 A | 1/1975 | Furuya |
| 3,896,266 A | 7/1975 | Waterbury |
| 3,938,091 A | 2/1976 | Atalla et al. |
| 4,013,962 A | 3/1977 | Beseke et al. |
| 4,321,672 A | 3/1982 | Braun et al. |
| 4,567,359 A | 1/1986 | Lockwood |
| 4,633,397 A | 12/1986 | Macco |
| 4,695,880 A | 9/1987 | Johnson et al. |

(Continued)

FOREIGN PATENT DOCUMENTS

CA 2430549 6/2002

(Continued)

OTHER PUBLICATIONS

Luckham, David, "Achieving Instant Insight into the Real-time Electronic Enterprise".

(Continued)

*Primary Examiner*—Meng-Ai An
*Assistant Examiner*—Jennifer N To
(74) *Attorney, Agent, or Firm*—Lowenstein Sandler PC (57) ABSTRACT

The present invention involves methods and systems for managing successful completion of a network of processes. The network of processes can be represented as a graph. In this representation, the nodes of the graph represent the processes, and the edges of the graph represent events associated with the processes. Processing starts at the root node, and is based on the result of an initially unknown graph. When an event is to be produced or consumed, a message to that effect is transmitted to a component called a Q-Manager. Using the messages, which are received in event order, the Q-Manager keeps track of the state of the graph, and determines when successful completion of the processing has occurred. Once this occurs, the Q-Manager sends a notification indicating completion of the network.

13 Claims, 3 Drawing Sheets

U.S. PATENT DOCUMENTS

| | | |
|---|---|---|
| 4,696,491 A | 9/1987 | Stenger |
| 4,713,761 A | 12/1987 | Sharpe et al. |
| 4,725,719 A | 2/1988 | Oncken et al. |
| 4,745,468 A | 5/1988 | Von Kohorn |
| 4,799,156 A | 1/1989 | Shavit |
| 4,801,787 A | 1/1989 | Suzuki |
| 4,823,264 A | 4/1989 | Deming |
| 4,882,675 A | 11/1989 | Nichtberger et al. |
| 4,926,255 A | 5/1990 | Von Kohorn |
| 4,941,090 A | 7/1990 | McCarthy |
| 4,964,043 A | 10/1990 | Galvin |
| 4,992,940 A | 2/1991 | Dworkin |
| 5,016,270 A | 5/1991 | Katz |
| 5,050,207 A | 9/1991 | Hitchcock |
| 5,084,816 A | 1/1992 | Boese |
| 5,117,355 A | 5/1992 | McCarthy |
| 5,157,717 A | 10/1992 | Hitchcock |
| 5,189,606 A | 2/1993 | Burns et al. |
| 5,202,826 A | 4/1993 | McCarthy |
| 5,233,654 A | 8/1993 | Harvey et al. |
| 5,235,509 A | 8/1993 | Mueller et al. |
| 5,241,594 A | 8/1993 | Kung |
| 5,265,033 A | 11/1993 | Vajk |
| 5,287,268 A | 2/1994 | McCarthy |
| 5,297,026 A | 3/1994 | Hoffman |
| 5,317,683 A | 5/1994 | Hager et al. |
| 5,321,841 A | 6/1994 | East |
| 5,351,186 A | 9/1994 | Bullock |
| 5,381,332 A | 1/1995 | Wood |
| 5,412,708 A | 5/1995 | Katz |
| 5,420,405 A | 5/1995 | Chasek |
| 5,446,740 A | 8/1995 | Yien |
| 5,450,134 A | 9/1995 | Legate |
| 5,450,537 A | 9/1995 | Hirai et al. |
| 5,465,206 A | 11/1995 | Hilt et al. |
| 5,467,269 A | 11/1995 | Flaten |
| 5,473,143 A | 12/1995 | Vak |
| 5,473,732 A | 12/1995 | Change |
| 5,479,530 A | 12/1995 | Nair et al. |
| 5,511,117 A | 4/1996 | Zazzera |
| 5,513,102 A | 4/1996 | Auriemma |
| 5,532,920 A | 7/1996 | Hartrick |
| 5,534,855 A | 7/1996 | Shockley et al. |
| 5,537,314 A | 7/1996 | Kanter |
| 5,537,473 A | 7/1996 | Saward |
| 5,544,086 A | 8/1996 | Davis et al. |
| 5,551,021 A | 8/1996 | Harada |
| 5,557,334 A | 9/1996 | Legate |
| 5,557,518 A | 9/1996 | Rosen |
| 5,560,008 A | 9/1996 | Johnson et al. |
| 5,568,489 A | 10/1996 | Yien |
| 5,570,295 A | 10/1996 | Isenberg |
| 5,570,465 A | 10/1996 | Tsakanikas |
| 5,576,951 A | 11/1996 | Lockwood |
| 5,583,778 A | 12/1996 | Wind |
| 5,590,199 A | 12/1996 | Krajewski et al. |
| 5,592,378 A | 1/1997 | Cameron |
| 5,592,553 A | 1/1997 | Guski et al. |
| 5,592,560 A | 1/1997 | Deaton et al. |
| 5,594,837 A | 1/1997 | Noyes |
| 5,598,557 A | 1/1997 | Doner |
| 5,602,936 A | 2/1997 | Lynn |
| 5,603,025 A | 2/1997 | Tabb |
| 5,604,490 A | 2/1997 | Blakley et al. |
| 5,606,496 A | 2/1997 | D'Agostino |
| 5,611,052 A | 3/1997 | Dykstra |
| 5,621,201 A | 4/1997 | Langhans |
| 5,621,789 A | 4/1997 | McCalmont |
| 5,621,812 A | 4/1997 | Deaton et al. |
| 5,625,767 A | 4/1997 | Bartell |
| 5,630,173 A | 5/1997 | Oprescu |
| 5,634,101 A | 5/1997 | Blau |
| 5,638,457 A | 6/1997 | Deaton et al. |
| 5,640,577 A | 6/1997 | Scharmer |
| 5,642,419 A | 6/1997 | Rosen |
| 5,644,493 A | 7/1997 | Motai |
| 5,653,914 A | 8/1997 | Holmes et al. |
| 5,657,383 A | 8/1997 | Gerber |
| 5,659,165 A | 8/1997 | Jennings |
| 5,661,807 A | 8/1997 | Guski et al. |
| 5,664,115 A | 9/1997 | Fraser |
| 5,666,493 A | 9/1997 | Wojcik et al. |
| 5,671,285 A | 9/1997 | Newman |
| 5,675,637 A | 10/1997 | Szlam et al. |
| 5,675,662 A | 10/1997 | Deaton et al. |
| 5,677,955 A | 10/1997 | Doggett et al. |
| 5,678,046 A | 10/1997 | Cahill et al. |
| 5,682,524 A | 10/1997 | Freund |
| 5,684,870 A | 11/1997 | Maloney |
| 5,687,322 A | 11/1997 | Deaton et al. |
| 5,689,100 A | 11/1997 | Carrithers et al. |
| 5,692,132 A | 11/1997 | Hogan |
| 5,699,528 A | 12/1997 | Hogan |
| 5,703,344 A | 12/1997 | Bezy et al. |
| 5,710,886 A | 1/1998 | Christensen et al. |
| 5,710,887 A | 1/1998 | Chelliah |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,715,402 A | 2/1998 | Popolo |
| 5,715,450 A | 2/1998 | Ambrose |
| 5,724,424 A | 3/1998 | Gifford |
| 5,727,163 A | 3/1998 | Bezos |
| 5,734,838 A | 3/1998 | Robinson |
| 5,737,414 A | 4/1998 | Walker et al. |
| 5,740,231 A | 4/1998 | Cohn et al. |
| 5,754,840 A | 5/1998 | Rivette |
| 5,758,126 A | 5/1998 | Daniels et al. |
| 5,758,328 A | 5/1998 | Giovannoli |
| 5,761,288 A | 6/1998 | Pinard et al. |
| 5,761,647 A | 6/1998 | Boushy |
| 5,761,661 A | 6/1998 | Coussenns |
| 5,764,789 A | 6/1998 | Pare et al. |
| 5,765,141 A | 6/1998 | Spector |
| 5,765,143 A | 6/1998 | Sheldon |
| 5,768,382 A | 6/1998 | Schnier et al. |
| 5,774,122 A | 6/1998 | Kojima |
| 5,778,178 A | 7/1998 | Arunachalam |
| 5,781,909 A | 7/1998 | Logan et al. |
| 5,784,557 A | 7/1998 | Oprescu |
| 5,784,562 A | 7/1998 | Diener |
| 5,787,403 A | 7/1998 | Randle |
| 5,787,404 A | 7/1998 | Fernandez-Holman |
| 5,790,650 A | 8/1998 | Dunn |
| 5,790,785 A | 8/1998 | Klug et al. |
| 5,793,861 A | 8/1998 | Haigh |
| 5,794,178 A | 8/1998 | Caid et al. |
| 5,794,207 A | 8/1998 | Walker |
| 5,794,259 A | 8/1998 | Kikinis |
| 5,796,395 A | 8/1998 | De Hond |
| 5,797,127 A | 8/1998 | Walker et al. |
| 5,798,508 A | 8/1998 | Walker et al. |
| 5,802,498 A | 9/1998 | Comesanas |
| 5,802,502 A | 9/1998 | Gell |
| 5,805,719 A | 9/1998 | Pare et al. |
| 5,815,657 A | 9/1998 | Williams et al. |
| 5,815,665 A | 9/1998 | Teper et al. |
| 5,815,683 A | 9/1998 | Vogler |
| 5,818,936 A | 10/1998 | Moshayekhi |
| 5,819,092 A | 10/1998 | Ferguson |
| 5,819,285 A | 10/1998 | Damico |
| 5,825,863 A | 10/1998 | Walker |
| 5,825,870 A | 10/1998 | Miloslavsky |

| Patent | Date | Inventor |
|---|---|---|
| 5,826,241 A | 10/1998 | Stein |
| 5,826,245 A | 10/1998 | Sandberg-Diment |
| 5,826,250 A | 10/1998 | Trefler |
| 5,828,734 A | 10/1998 | Katz |
| 5,828,751 A | 10/1998 | Walker et al. |
| 5,828,812 A | 10/1998 | Khan et al. |
| 5,828,833 A | 10/1998 | Belville et al. |
| 5,832,211 A | 11/1998 | Blakley, III et al. |
| 5,832,460 A | 11/1998 | Bednar |
| 5,832,476 A | 11/1998 | Tada |
| 5,835,580 A | 11/1998 | Fraser |
| 5,835,603 A | 11/1998 | Coutts |
| 5,838,903 A | 11/1998 | Blakely, III et al. |
| 5,838,906 A | 11/1998 | Doyle |
| 5,842,178 A | 11/1998 | Giovannoli |
| 5,842,211 A | 11/1998 | Horadan |
| 5,844,553 A | 12/1998 | Hao |
| 5,845,259 A | 12/1998 | West et al. |
| 5,845,260 A | 12/1998 | Nakano et al. |
| 5,847,709 A | 12/1998 | Card |
| 5,848,400 A | 12/1998 | Chang |
| 5,848,427 A | 12/1998 | Hyodo |
| 5,852,812 A | 12/1998 | Reeder |
| 5,857,079 A | 1/1999 | Claus et al. |
| 5,862,223 A | 1/1999 | Walker |
| 5,862,323 A | 1/1999 | Blakley, III et al. |
| 5,864,830 A | 1/1999 | Armetta et al. |
| RE36,116 E | 2/1999 | McCarthy |
| 5,866,889 A | 2/1999 | Weiss et al. |
| 5,870,718 A | 2/1999 | Spector |
| 5,870,725 A | 2/1999 | Belinger et al. |
| 5,871,398 A | 2/1999 | Schneier et al. |
| 5,873,072 A | 2/1999 | Kight |
| 5,873,096 A | 2/1999 | Lim |
| 5,880,769 A | 3/1999 | Nemirofsky |
| 5,884,032 A | 3/1999 | Bateman |
| 5,884,270 A | 3/1999 | Walker et al. |
| 5,884,272 A | 3/1999 | Walker et al. |
| 5,884,274 A | 3/1999 | Walker et al. |
| 5,884,288 A | 3/1999 | Chang |
| 5,889,863 A | 3/1999 | Weber |
| 5,892,900 A | 4/1999 | Ginter et al. |
| 5,898,780 A | 4/1999 | Liu et al. |
| 5,899,982 A | 5/1999 | Randle |
| 5,903,881 A | 5/1999 | Schrader |
| 5,909,486 A | 6/1999 | Walker et al. |
| 5,910,988 A | 6/1999 | Ballard |
| 5,913,202 A | 6/1999 | Motoyama |
| 5,914,472 A | 6/1999 | Foladare et al. |
| 5,915,244 A | 6/1999 | Jack et al. |
| 5,918,214 A | 6/1999 | Perkowski |
| 5,918,217 A | 6/1999 | Maggioncalda |
| 5,918,239 A | 6/1999 | Allen et al. |
| 5,920,847 A | 7/1999 | Kolling et al. |
| 5,921,864 A | 7/1999 | Walker et al. |
| 5,923,763 A | 7/1999 | Walker et al. |
| 5,926,796 A | 7/1999 | Walker et al. |
| 5,926,812 A | 7/1999 | Hilsenrath |
| 5,930,764 A | 7/1999 | Melchione |
| 5,933,816 A | 8/1999 | Zeanah et al. |
| 5,933,817 A | 8/1999 | Hucal |
| 5,933,823 A | 8/1999 | Cullen |
| 5,933,827 A | 8/1999 | Cole et al. |
| 5,940,812 A | 8/1999 | Tengel et al. |
| 5,943,656 A | 8/1999 | Crooks |
| 5,944,824 A | 8/1999 | He |
| 5,945,653 A | 8/1999 | Walker et al. |
| 5,946,388 A | 8/1999 | Walker et al. |
| 5,947,747 A | 9/1999 | Walker et al. |
| 5,949,044 A | 9/1999 | Walker et al. |
| 5,949,875 A | 9/1999 | Walker et al. |
| 5,950,173 A | 9/1999 | Perkowski |
| 5,950,174 A | 9/1999 | Brendzel |
| 5,950,206 A | 9/1999 | Krause |
| 5,952,639 A | 9/1999 | Ohki et al. |
| 5,952,641 A | 9/1999 | Korshun |
| 5,953,710 A | 9/1999 | Fleming |
| 5,956,695 A | 9/1999 | Carrithers et al. |
| 5,958,007 A | 9/1999 | Lee et al. |
| 5,960,411 A | 9/1999 | Hartman et al. |
| 5,961,593 A | 10/1999 | Gabber et al. |
| 5,963,635 A | 10/1999 | Szlam et al. |
| 5,963,925 A | 10/1999 | Kolling et al. |
| 5,963,952 A | 10/1999 | Smith |
| 5,963,953 A | 10/1999 | Cram et al. |
| 5,966,695 A | 10/1999 | Melchione et al. |
| 5,966,699 A | 10/1999 | Zandi |
| 5,967,896 A | 10/1999 | Jorasch et al. |
| 5,969,318 A | 10/1999 | Mackenthun |
| 5,970,143 A | 10/1999 | Schneier et al. |
| 5,970,470 A | 10/1999 | Walker et al. |
| 5,970,478 A | 10/1999 | Walker et al. |
| 5,970,482 A | 10/1999 | Pham |
| 5,970,483 A | 10/1999 | Evans |
| 5,978,467 A | 11/1999 | Walker et al. |
| 5,983,196 A | 11/1999 | Wendkos |
| 5,987,434 A | 11/1999 | Libman |
| 5,987,454 A | 11/1999 | Hobbs |
| 5,987,498 A | 11/1999 | Athing et al. |
| 5,991,736 A | 11/1999 | Ferguson et al. |
| 5,991,738 A | 11/1999 | Ogram |
| 5,991,748 A | 11/1999 | Taskett |
| 5,991,751 A | 11/1999 | Rivette et al. |
| 5,991,780 A | 11/1999 | Rivette |
| 5,995,948 A | 11/1999 | Whitford |
| 5,995,976 A | 11/1999 | Walker et al. |
| 5,999,596 A | 12/1999 | Walker et al. |
| 5,999,907 A | 12/1999 | Donner |
| 6,000,033 A | 12/1999 | Kelly et al. |
| 6,001,016 A | 12/1999 | Walker et al. |
| 6,003,762 A | 12/1999 | Hayashida |
| 6,005,939 A | 12/1999 | Fortenberry et al. |
| 6,006,205 A | 12/1999 | Loeb et al. |
| 6,006,249 A | 12/1999 | Leong |
| 6,009,405 A | 12/1999 | Leymann et al. |
| 6,009,415 A | 12/1999 | Shurling et al. |
| 6,009,442 A | 12/1999 | Chen et al. |
| 6,010,404 A | 1/2000 | Walker et al. |
| 6,012,088 A | 1/2000 | Li et al. |
| 6,012,983 A | 1/2000 | Walker et al. |
| 6,014,439 A | 1/2000 | Walker et al. |
| 6,014,635 A | 1/2000 | Harris et al. |
| 6,014,636 A | 1/2000 | Reeder |
| 6,014,638 A | 1/2000 | Burge et al. |
| 6,014,641 A | 1/2000 | Loeb et al. |
| 6,014,645 A | 1/2000 | Cunningham |
| 6,016,476 A | 1/2000 | Maes et al. |
| 6,016,810 A | 1/2000 | Ravenscroft |
| 6,018,714 A | 1/2000 | Risen, Jr. |
| 6,018,718 A | 1/2000 | Walker et al. |
| 6,024,640 A | 2/2000 | Walker et al. |
| 6,026,398 A | 2/2000 | Brown et al. |
| 6,026,429 A | 2/2000 | Jones et al. |
| 6,032,134 A | 2/2000 | Weissman |
| 6,032,147 A | 2/2000 | Williams et al. |
| 6,038,547 A | 3/2000 | Casto |
| 6,038,552 A | 3/2000 | Fleischl et al. |
| 6,042,006 A | 3/2000 | Van Tilburg et al. |
| 6,044,362 A | 3/2000 | Neely |
| 6,045,039 A | 4/2000 | Stinson et al. |
| 6,049,778 A | 4/2000 | Walker et al. |
| 6,049,782 A | 4/2000 | Gottesman et al. |
| 6,049,835 A | 4/2000 | Gagnon |
| 6,055,637 A | 4/2000 | Hudson et al. |
| 6,061,665 A | 5/2000 | Bahreman |
| 6,064,987 A | 5/2000 | Walker et al. |

| | | |
|---|---|---|
| 6,065,009 A | 5/2000 | Leymann et al. |
| 6,065,120 A | 5/2000 | Laursen et al. |
| 6,065,675 A | 5/2000 | Teicher |
| 6,070,147 A | 5/2000 | Harms et al. |
| 6,070,153 A | 5/2000 | Simpson |
| 6,070,244 A | 5/2000 | Orchier et al. |
| 6,073,105 A | 6/2000 | Sutcliffe et al. |
| 6,073,113 A | 6/2000 | Guinan |
| 6,075,519 A | 6/2000 | Okatani et al. |
| 6,076,072 A | 6/2000 | Libman |
| 6,081,790 A | 6/2000 | Rosen |
| 6,081,810 A | 6/2000 | Rosenzweig et al. |
| 6,081,900 A | 6/2000 | Subramaniam et al. |
| 6,085,168 A | 7/2000 | Mori et al. |
| 6,088,444 A | 7/2000 | Walker et al. |
| 6,088,451 A | 7/2000 | He et al. |
| 6,088,683 A | 7/2000 | Jalili |
| 6,088,686 A | 7/2000 | Walker et al. |
| 6,088,700 A | 7/2000 | Larsen et al. |
| 6,091,817 A | 7/2000 | Bertina et al. |
| 6,092,192 A | 7/2000 | Kanevsky et al. |
| 6,092,196 A | 7/2000 | Reiche |
| 6,095,412 A | 8/2000 | Bertina et al. |
| 6,098,070 A | 8/2000 | Maxwell |
| 6,101,486 A | 8/2000 | Roberts et al. |
| 6,104,716 A | 8/2000 | Crichton et al. |
| 6,105,012 A | 8/2000 | Chang et al. |
| 6,105,865 A | 8/2000 | Hardesty |
| 6,108,698 A | 8/2000 | Tenev et al. |
| 6,111,858 A | 8/2000 | Greaves et al. |
| 6,112,181 A | 8/2000 | Shear et al. |
| 6,115,690 A | 9/2000 | Wong |
| 6,119,093 A | 9/2000 | Walker et al. |
| 6,119,099 A | 9/2000 | Walker et al. |
| 6,128,599 A | 10/2000 | Walker et al. |
| 6,128,602 A | 10/2000 | Northington et al. |
| 6,131,810 A | 10/2000 | Weiss et al. |
| 6,134,549 A | 10/2000 | Regnier et al. |
| 6,134,592 A | 10/2000 | Montulli |
| 6,135,349 A | 10/2000 | Zirkel |
| 6,138,106 A | 10/2000 | Walker et al. |
| 6,138,118 A | 10/2000 | Koppstein et al. |
| 6,141,651 A | 10/2000 | Riley et al. |
| 6,141,666 A | 10/2000 | Tobin |
| 6,144,946 A | 11/2000 | Iwamura |
| 6,144,948 A | 11/2000 | Walker et al. |
| 6,145,086 A | 11/2000 | Bellemore et al. |
| 6,148,293 A | 11/2000 | King |
| 6,151,584 A | 11/2000 | Papierniak et al. |
| 6,154,750 A | 11/2000 | Roberge et al. |
| 6,154,879 A | 11/2000 | Pare et al. |
| 6,161,182 A | 12/2000 | Nadooshan |
| 6,164,533 A | 12/2000 | Barton |
| 6,170,011 B1 | 1/2001 | Beck et al. |
| 6,178,511 B1 | 1/2001 | Cohen et al. |
| 6,182,052 B1 | 1/2001 | Fulton et al. |
| 6,182,142 B1 | 1/2001 | Win et al. |
| 6,182,220 B1 | 1/2001 | Chen et al. |
| 6,182,225 B1 | 1/2001 | Hagiuda et al. |
| 6,185,242 B1 | 2/2001 | Arthur et al. |
| 6,189,029 B1 | 2/2001 | Fuerst |
| 6,195,644 B1 | 2/2001 | Bowie |
| 6,199,077 B1 | 3/2001 | Inala et al. |
| 6,201,948 B1 | 3/2001 | Cook et al. |
| 6,202,005 B1 | 3/2001 | Mahaffey |
| 6,202,054 B1 | 3/2001 | Lawlor et al. |
| 6,202,151 B1 | 3/2001 | Musgrave et al. |
| 6,202,158 B1 | 3/2001 | Urano et al. |
| 6,208,978 B1 | 3/2001 | Walker et al. |
| 6,208,984 B1 | 3/2001 | Rosenthal |
| 6,216,115 B1 | 4/2001 | Barrameda et al. |
| 6,219,639 B1 | 4/2001 | Bakis et al. |
| 6,219,706 B1 | 4/2001 | Fan |
| 6,222,914 B1 | 4/2001 | McMullin |
| 6,226,623 B1 | 5/2001 | Schein et al. |
| 6,226,679 B1 | 5/2001 | Gupta |
| 6,226,752 B1 | 5/2001 | Gupta et al. |
| 6,227,447 B1 | 5/2001 | Campisano |
| 6,230,148 B1 | 5/2001 | Pare et al. |
| 6,243,688 B1 | 6/2001 | Kalina |
| 6,243,816 B1 | 6/2001 | Fang et al. |
| 6,253,327 B1 | 6/2001 | Zhang et al. |
| 6,253,328 B1 | 6/2001 | Smith, Jr. |
| 6,256,664 B1 | 7/2001 | Donoho et al. |
| 6,260,026 B1 | 7/2001 | Tomida et al. |
| 6,266,648 B1 | 7/2001 | Baker, III |
| 6,266,683 B1 | 7/2001 | Yehuda et al. |
| 6,267,292 B1 | 7/2001 | Walker et al. |
| 6,269,348 B1 | 7/2001 | Pare et al. |
| 6,275,944 B1 | 8/2001 | Kao et al. |
| 6,289,322 B1 | 9/2001 | Kitchen et al. |
| 6,298,330 B1 | 10/2001 | Gardenswartz et al. |
| 6,298,356 B1 | 10/2001 | Jawahar et al. |
| 6,301,567 B1 | 10/2001 | Leong et al. |
| 6,308,273 B1 | 10/2001 | Goertzel et al. |
| 6,308,274 B1 | 10/2001 | Swift |
| 6,311,275 B1 | 10/2001 | Jin et al. |
| 6,317,834 B1 | 11/2001 | Gennaro et al. |
| 6,317,838 B1 | 11/2001 | Baize |
| 6,324,524 B1 | 11/2001 | Lent et al. |
| 6,327,573 B1 | 12/2001 | Walker et al. |
| 6,327,578 B1 | 12/2001 | Linehan |
| 6,332,192 B1 | 12/2001 | Boroditsky et al. |
| 6,336,104 B1 | 1/2002 | Walker et al. |
| 6,343,279 B1 | 1/2002 | Bissonette et al. |
| 6,345,261 B1 | 2/2002 | Feidelson |
| 6,349,242 B2 | 2/2002 | Mahaffey |
| 6,349,336 B1 | 2/2002 | Sit et al. |
| 6,363,381 B1 | 3/2002 | Lee et al. |
| 6,381,609 B1 | 4/2002 | Breitbart et al. |
| 6,385,591 B1 | 5/2002 | Mankoff |
| 6,385,652 B1 | 5/2002 | Brown et al. |
| 6,401,125 B1 | 6/2002 | Makarios et al. |
| 6,401,211 B1 | 6/2002 | Brezak, Jr. et al. |
| 6,408,389 B2 | 6/2002 | Grawrock et al. |
| 6,411,933 B1 | 6/2002 | Maes et al. |
| 6,418,457 B1 | 7/2002 | Schmidt et al. |
| 6,438,594 B1 | 8/2002 | Bowman-Amuah |
| 6,438,666 B2 | 8/2002 | Cassagnol et al. |
| 6,449,765 B1 | 9/2002 | Ballard |
| 6,453,353 B1 | 9/2002 | Win et al. |
| 6,460,141 B1 | 10/2002 | Olden |
| 6,487,641 B1 | 11/2002 | Cusson et al. |
| 6,493,677 B1 | 12/2002 | von Rosen et al. |
| 6,493,685 B1 | 12/2002 | Ensel et al. |
| 6,496,855 B1 | 12/2002 | Hunt et al. |
| 6,496,936 B1 | 12/2002 | French et al. |
| 6,502,095 B2 | 12/2002 | Breitbart et al. |
| 6,507,912 B1 | 1/2003 | Matyas, Jr. et al. |
| 6,510,523 B1 | 1/2003 | Perlman et al. |
| 6,526,404 B1 | 2/2003 | Slater et al. |
| 6,532,284 B2 | 3/2003 | Walker et al. |
| 6,535,855 B1 | 3/2003 | Cahill et al. |
| 6,535,917 B1 | 3/2003 | Zamanzadeh et al. |
| 6,535,980 B1 | 3/2003 | Kumar et al. |
| 6,539,337 B1 | 3/2003 | Provan et al. |
| 6,539,424 B1 | 3/2003 | Dutta |
| 6,557,039 B1 | 4/2003 | Leong et al. |
| 6,574,348 B1 | 6/2003 | Venkatesan et al. |
| 6,580,814 B1 | 6/2003 | Ittycheriah et al. |
| 6,581,040 B1 | 6/2003 | Wright et al. |
| 6,584,505 B1 | 6/2003 | Howard et al. |
| 6,584,508 B1 | 6/2003 | Epstein et al. |
| 6,589,291 B1 | 7/2003 | Boag et al. |
| 6,592,044 B1 | 7/2003 | Wong et al. |
| 6,609,106 B1 | 8/2003 | Robertson |

| | | | | | | |
|---|---|---|---|---|---|---|
| 6,609,113 B1 | 8/2003 | O'Leary et al. | | 2002/0152163 A1 | 10/2002 | Bezos et al. |
| 6,609,125 B1 | 8/2003 | Layne et al. | | 2002/0165949 A1 | 11/2002 | Na |
| 6,609,198 B1 | 8/2003 | Wood et al. | | 2002/0174010 A1 | 11/2002 | Rice, III |
| 6,609,654 B1 | 8/2003 | Anderson et al. | | 2002/0184507 A1 | 12/2002 | Makower et al. |
| 6,618,579 B1 | 9/2003 | Smith et al. | | 2002/0188765 A1 | 12/2002 | Fong et al. |
| 6,618,806 B1 | 9/2003 | Brown et al. | | 2002/0188869 A1 | 12/2002 | Patrick |
| 6,623,415 B2 | 9/2003 | Gates et al. | | 2002/0191548 A1 | 12/2002 | Ylonen et al. |
| 6,640,302 B1 | 10/2003 | Subramaniam et al. | | 2002/0198806 A1 | 12/2002 | Blagg et al. |
| 6,668,322 B1 | 12/2003 | Wood et al. | | 2003/0001888 A1 | 1/2003 | Power |
| 6,675,261 B2 | 1/2004 | Shandony | | 2003/0018915 A1 | 1/2003 | Stoll |
| 6,684,384 B1 | 1/2004 | Bickerton et al. | | 2003/0023880 A1 | 1/2003 | Edward et al. |
| 6,687,222 B1 | 2/2004 | Albert et al. | | 2003/0034388 A1 | 2/2003 | Routhenstein et al. |
| 6,687,245 B2 | 2/2004 | Fangman et al. | | 2003/0037131 A1 | 2/2003 | Verma |
| 6,697,947 B1 | 2/2004 | Matyas, Jr. et al. | | 2003/0037142 A1 | 2/2003 | Munger et al. |
| 6,714,987 B1 | 3/2004 | Amin et al. | | 2003/0040995 A1 | 2/2003 | Daddario et al. |
| 6,718,482 B2 | 4/2004 | Sato et al. | | 2003/0046587 A1 | 3/2003 | Bheemarasetti et al. |
| 6,718,535 B1 | 4/2004 | Underwood | | 2003/0046589 A1 | 3/2003 | Gregg |
| 6,725,269 B1 | 4/2004 | Megiddo | | 2003/0051026 A1 | 3/2003 | Carter et al. |
| 6,735,695 B1 | 5/2004 | Gopalakrishnan et al. | | 2003/0055871 A1 | 3/2003 | Roses |
| 6,738,779 B1 | 5/2004 | Shapira | | 2003/0070069 A1 | 4/2003 | Belapurkar et al. |
| 6,751,654 B2 | 6/2004 | Massarani et al. | | 2003/0070084 A1 | 4/2003 | Satomaa et al. |
| 6,754,833 B1 | 6/2004 | Black et al. | | 2003/0074580 A1 | 4/2003 | Knouse et al. |
| 6,755,341 B1 | 6/2004 | Wong et al. | | 2003/0079147 A1 | 4/2003 | Hsieh et al. |
| 6,766,370 B2 | 7/2004 | Glommen et al. | | 2003/0084345 A1 | 5/2003 | Bjornestad et al. |
| 6,769,605 B1 | 8/2004 | Magness | | 2003/0084647 A1 | 5/2003 | Smith et al. |
| 6,772,146 B2 | 8/2004 | Khemlani et al. | | 2003/0088552 A1 | 5/2003 | Bennett et al. |
| 6,785,810 B1 | 8/2004 | Lirov et al. | | 2003/0105981 A1 | 6/2003 | Miller et al. |
| 6,789,115 B1 | 9/2004 | Singer et al. | | 2003/0110399 A1 | 6/2003 | Rail |
| 6,805,288 B2 | 10/2004 | Routhenstein et al. | | 2003/0115160 A1 | 6/2003 | Nowlin et al. |
| 6,810,395 B1 | 10/2004 | Bharat | | 2003/0119642 A1 | 6/2003 | Gates et al. |
| 6,819,219 B1 | 11/2004 | Bolle et al. | | 2003/0154403 A1 | 8/2003 | Keinsley et al. |
| 6,820,202 B1 | 11/2004 | Wheeler et al. | | 2003/0159072 A1 | 8/2003 | Bellinger et al. |
| 6,832,202 B1 | 12/2004 | Schuyler et al. | | 2003/0163700 A1 | 8/2003 | Paatero |
| 6,856,970 B1 | 2/2005 | Campbell et al. | | 2003/0163733 A1 | 8/2003 | Barriga-Caceres et al. |
| 6,892,231 B2 | 5/2005 | Jager | | 2003/0177067 A1 | 9/2003 | Cowell et al. |
| 6,907,566 B1 | 6/2005 | McElfresh et al. | | 2003/0191549 A1 | 10/2003 | Otsuka et al. |
| 6,925,481 B2 | 8/2005 | Singhal et al. | | 2003/0217033 A1 | 11/2003 | Sandler et al. |
| 6,950,936 B2 | 9/2005 | Subramaniam et al. | | 2003/0225870 A1* | 12/2003 | Sandadi et al. .............. 709/223 |
| 6,983,421 B1 | 1/2006 | Lahti et al. | | 2004/0031856 A1 | 2/2004 | Atsmon et al. |
| 6,992,786 B1 | 1/2006 | Breding et al. | | 2004/0049702 A1 | 3/2004 | Subramaniam et al. |
| 7,020,696 B1 | 3/2006 | Perry et al. | | 2004/0117409 A1 | 6/2004 | Scahill et al. |
| 7,058,817 B1 | 6/2006 | Ellmore | | 2005/0080747 A1 | 4/2005 | Anderson et al. |
| 7,080,036 B1 | 7/2006 | Drummond et al. | | 2005/0082362 A1 | 4/2005 | Anderson et al. |
| 7,089,208 B1 | 8/2006 | Levchin et al. | | 2005/0086160 A1 | 4/2005 | Wong et al. |
| 7,117,239 B1 | 10/2006 | Hansen | | 2005/0086177 A1 | 4/2005 | Anderson et al. |
| 2001/0011255 A1 | 8/2001 | Asay et al. | | 2005/0120180 A1 | 6/2005 | Schombach et al. |
| 2001/0012974 A1 | 8/2001 | Mahaffey | | 2005/0278641 A1 | 12/2005 | Mansour et al. |
| 2001/0027474 A1 | 10/2001 | Nachman et al. | | | | |
| 2001/0032184 A1 | 10/2001 | Tenembaum | | | | |
| 2001/0047295 A1 | 11/2001 | Tenembaum | | FOREIGN PATENT DOCUMENTS | | |
| 2001/0049712 A1* | 12/2001 | Leymann et al. ............ 709/100 | | DE | 19731293 | 1/1999 |
| 2001/0051917 A1 | 12/2001 | Bissonette et al. | | EP | 0884877 | 12/1998 |
| 2001/0054003 A1 | 12/2001 | Chien et al. | | EP | 0917119 | 5/1999 |
| 2002/0007313 A1 | 1/2002 | Mai et al. | | EP | 1014318 A2 | 6/2000 |
| 2002/0007460 A1 | 1/2002 | Azuma | | EP | 1022664 | 7/2000 |
| 2002/0010599 A1 | 1/2002 | Levison | | EP | 1056043 | 11/2000 |
| 2002/0010668 A1 | 1/2002 | Travis et al. | | EP | 1089516 | 4/2001 |
| 2002/0018585 A1 | 2/2002 | Kim | | JP | H10-187467 | 7/1998 |
| 2002/0019938 A1 | 2/2002 | Aarons | | JP | 2000/324329 | 11/2000 |
| 2002/0023108 A1 | 2/2002 | Daswani et al. | | JP | 2001134672 | 5/2001 |
| 2002/0029269 A1 | 3/2002 | McCarty et al. | | JP | 2005-242976 | 9/2005 |
| 2002/0032613 A1 | 3/2002 | Buettgenbach et al. | | WO | 97/43736 | 11/1997 |
| 2002/0032650 A1 | 3/2002 | Hauser et al. | | WO | 99/40507 A1 | 8/1999 |
| 2002/0059141 A1 | 5/2002 | Davies et al. | | WO | 99/52051 | 10/1999 |
| 2002/0077978 A1 | 6/2002 | O'Leary et al. | | WO | 00/68858 | 11/2000 |
| 2002/0087447 A1 | 7/2002 | McDonald et al. | | WO | 01/18656 A1 | 3/2001 |
| 2002/0095443 A1 | 7/2002 | Kovack | | WO | 01/35355 | 5/2001 |
| 2002/0099826 A1 | 7/2002 | Summers et al. | | WO | 01/43084 | 6/2001 |
| 2002/0104006 A1 | 8/2002 | Boate et al. | | WO | 0188659 | 11/2001 |
| 2002/0104017 A1 | 8/2002 | Stefan | | WO | 02/17082 A1 | 2/2002 |
| 2002/0107788 A1 | 8/2002 | Cunningham | | WO | WO0246980 | 6/2002 |
| 2002/0116205 A1 | 8/2002 | Ankireddipally et al. | | | | |
| 2002/0144101 A1 | 10/2002 | Wang et al. | | | | |

WO     2004/079603     9/2004

OTHER PUBLICATIONS

Moser, Louise E., "Transactions in a Distributed Object Environment", Dept. of Electrical and Computer Engineering, Univ. of California, Final report 1997-98 for MICRO Project 97-122.
Boekhoudt et al., "Graph-based analysis of business process models", Telematica Instituut.
Strom et al., Gryphon: An Information Flow Based Approach to Message Brokering, International Symposium on Software Reliability, 1998.
Boulet, Pierre, "Distributed Systems: Processes and Processors", Distributed Systems, pp. 1-27.
Deng et al., "A Probabilistic Approach to fault Diagnosis in Linear Lightwave Networks" Dept. of Electrical Engineering, pp. 1-22, May 1992.
Echarge, Echarge Corporation, www.echarge.com, Dec. 3, 1999.
Summary of the At Your Request Architecture, First USA Bank Confidential and Proprietary, Apr. 2, 1999, pp. 1-8.
Siebel; Siebel: Ensuring Customer Success, www.siebel.com, Nov. 17, 1999.
OMG; Welcome to OMG's Corba for Beginners Page!, www.omg.co, May 25, 1999.
Sun Microsystems, Inc.; Schema for Representing Corba Objects in an LDAP Directory, May 21, 1999, pp. 1-9.
OMG; Library, www.omg.com, May 25, 1999.
OMG; What is Corba?, www.omg.com, May 25, 1999.
Anonymous; Overview of Corba, May 25, 1999.
Anonymous; Corba Overview, arch2.htm at Pent21.infosys.tuwien.ac.at, May 25, 1999.
Java; Java (TM) Technology in the Real World, java.sun.com, May 21, 1999.
Java; Java(TM) Servlet API, java.sun.com, May 21, 1999.
Java; Staying in Touch with JNDI, java.sun.com, May 21, 1999.
Java; Java(TM) Remote Method Invocation (RMI) Interface, java.sun.com, May, 21, 1999.
Java; Banking on Java(TM) Technology, java.sun.com, May 21, 1999.
Applets, java.sun.com, May 21, 1999.
Java; The JDBC(TM) Data Access API, java.sun.com, May 21, 1999.
Thomas; Enterprise Javabeans(TM) Technology: Server Component Model for the Java(TM) Platform, java.sun.com, May 2, 1999.
Getting Smart with Java: Sun Micro Says American Express to use Java for Smart Card, abcnews.com, Printed on Jun. 6, 2000.
Bank; Cash, Check,Charge—What's Next?, Seattle Times, Mar. 6, 1995.
Vandenengel; Cards on the Internet: Advertising on a $3 Bill, Industry Intelligence, Feb. 1, 1995, pp. 46-48.
Strassel; Dutch Software Concern Experiments with Electronic 'Cash' in Cyberspace, The Wall Street Journal, Apr. 17, 1995.
Kutler; Cash Card Creator Looking Beyond Mondex, Feb. 9, 1995.
Post; E-Cash: Can't Live With It, Can't Live Without It, The American Lawyer, Mar. 1, 1995, pp. 116-117.
Mitchell; Cyberspace: Crafting Software, Business Week, Feb. 27, 1999, pp. 78-86.
Kutler; A Different Drummer on the Data Highway, American Banker, Section: No. 91, vol. 160, May 12, 1995, p. 14.
Epper; A Player Goes After Big Bucks in Cyberspace, American Banker, vol. 160, No. 86, ISSN: 0002-7561, May 5, 1995, p. 17.
Barnham; Network Brings Together Producers and Companies, Document ID: 17347.
Houlder; Oft Gives the Individual Top Priority: Report Calls for Deregulation of Business Lending, Document ID: 91716, Jun. 8, 1994.
Maize; Fannie Mae on the Web, Doucment ID: 52079, May 8, 1995.
Knowles; Improved Internet Security Enabling On-Line Commerce, PCWeek, vol. 12, No. 11, ISSN: 0740-1604, Mar. 20, 1995.
Anonymous; Aversion Therapy: Banks Overcoming Fear of the 'Net to Develop Safe Internet-Based Payment System W/Netscape Communicator, Network World, ISSN: 0887-7661, Dec. 12, 1994.

Clark; Microsoft, VISA to Jointly Develop PC Electronic-Shopping Software, The Wall Street Journal, Nov. 9, 1994, Nov. 9, 1994 WSJ B9.
Hewlett-Packard Company; Understanding Product Data Management, Hewlett-Packard Company.
Getting Started: Specific GE TPN Post Service Use Guidelines, Printed on Apr. 26, 1999.
Resource Center: Consolidated Edison Selects GE TPN Post, Printed Apr. 26, 1999.
Thomas Publishing Company; Thomasnet, Apr. 26, 1999.
Thomas Publishing Company; Solusource: For Engineers by Engineers, Thomas Publishing Company, Apr. 26, 1999.
Harris; Harris Infosource, Printed on Apr. 26, 1999.
Welcome to Muse, Apr. 26, 1999.
Product Data Integration Technologies, Inc., Step Integratin Authors, Printed on Apr. 26, 1999.
SBA: Pro-Net, U.S. Small Business Administration Procurement Marketing and Access Network, Last Modified: Apr. 1, 1999.
Freemarkets, Printed Apr. 26, 1999.
At Your Request, www.wingspanbank.com, Sep. 28, 1999.
Meredith; Internet Bank Moves Closer to Virtual Reality, USA Today, May 5, 1995.
Sirbu, et al; Netbill: An Internet Commerce System Optimized for Network Delivered Services, Printed on Feb. 27, 1995.
The Check is in the Email, Information Today, vol. 12, No. 3, ISSN: 8755-6286, Mar. 1995.
The Gale Group; G&D America's Multi-Application Smart Card Selected for Combined Payroll and 'Virtual Banking' Program in Mexico, Business Wire, Apr. 24, 1998, P241047.
Mitchell; Netlink Goes After an Unbanked Niche, Card Technology, ISSN: 1093-1279, Sep. 1999, p. 22.
Berry et al.; A Potent New Tool for Selling Databse, Business Week, Cover Story, Sep. 5, 1994, pp. 56-62.
Shibata; Seventh International Conference on Parallel and Distributed Systems: Workshops, IEEE Computer Society, Jul. 4-7, 2000.
Jakobsson et al.; Secure and Lightweight Advertising on the Web, Computer Networks, 31 (1999) 1101-1109.
Fujimura et al.; XML Voucher: Generic Voucher Language, Feb. 2003.
Jepsen; Soap Cleans up Interoperability Problems on the Web, IT PTO, Jan./Feb. 2001.
Chester; Cross-Platform Integration With XML and Soap, IT PTO Sep.-Oct. 2001.
Friedman; Dictionary of Business Terms, Barron's Third Edition, Copyright 2000.
Consortium Created to Manage Common Electronic Purse Specifications, http://www.visa.com/av/news/prmisc051199.vhtml, printed Feb. 23, 2001.
Smartaxis, How it Works, http://www.smartaxis.co.uk/seller/howitworks.html, Printed on Feb. 23, 2001.
Bechtel Construction Operations Incorporated Standardizes on Primavera's Expedition Contract Management Software, Business Wire, Jul. 27, 1999.
Primavera and purchasepro.com to Create E-Commerce Marketplace for Construction Industry, Primavera Ships P3, Version 3.0, www.purchasepro.com/, Sep. 21, 1999, pp. 1-3.
Primavera Systems, Inc. - How the World Manages Projects, Expedition Contract Control Software, www.primavera.com, Jun. 23, 2005.
Civitello Jr.; Construction Operations Manual of Policies and Procedures, Third Edition, 2000.
Harris; Planning Using Primavera Project Planner P3 Version 3.0, User Guide, Copyright 1999 by Eastwood Harry Pty Ltd., 1999.
Ritz; Total Construction Project Management, McGraw-Hill, 1994.
Marchman; Construction Scheduling With Primavera Project Planner, May 25, 1999.
Associates National Bank (DE) Credit Card, The Associates, www.theassociates.com/consumer/credit_cards/main.html, Apr. 6, 1999, 6 pages.
Temporary Global Passwords, IBM Corporation, IBM TDB V36, N3, Mar. 2003, Order 93A 60636, Mar. 1, 1993, pp. 451-454.
Method of Protecting Data on a Personal Computer, IBM Corporation, TDB 11-85, Order 85A 62426, Nov. 1, 1995, p. 2530.

Safe Single-Sign-On Protocol With Minimal Password Exposure No Decryption and Technology Adaptivity, IBM Corporation, TDB 03-95, Order 95A, Mar. 1, 1995, pp. 245-248.

Servlet/Applet/html Authentication Process With Single Sign-On, IBM Corporation, IBM Order: 00A6004, Jan. 1, 2000.

Johnston; Pondering Passport; Do You Trust Microsoft With Your Data?, www.pcworld.com/resource/printable/article/0.aid,63244,00.asp, Sep. 24, 2001.

Kormann; Risks of the Passport Single Signon Protocol, Computer Networks, Elsevier Science Press, vol. 33, Sep. 20, 2003, pp. 51-58.

Carden, Philip; The New Face of Single Sign-On, Network Computing, http://www.networkcomputing.com, Printed Dec. 29, 2000, 4 pages.

Marlin; Chasing Document Management, Inform, vol. 13, No. 4, Apr. 1999, pp. 76-82.

Construction Financing to Build Your Own Home, ISBN: 0962864307, Jul. 1990.

Radosevich; Is Work Flow Working?, cnn.com, Apr. 6, 1999 at http://www.cnn.com/tech/computing/9904/06/workflow/ent.idg, p. 1 of 5, Retrieved From the Internet on Nov. 28, 2005.

Omware, Inc., Web Pages, Feb. 2000, Retrieved From http://web.archive.org/web20000226033405/www.omware.com/products.html, Retrieved From the Interneet on Nov. 28, 2005.

Point for Windows Version 3.X Interface Marketing Guide.PDF.

John N. Frank, Beyond Direct Mail, Credit Card Management, vol. 9, ISS. 5, Aug. 1996, 4 pgs.

Mary C. Lacity, et al.; The Information Systems Outsourcing Bandwagon, Sloan Management Review, vol. 35, No. 1, Fall 1993, p. 73-86.

Fusaro, Roberta; Builders Moving to Web Tools ComputerWorld, Nov. 16, 1998, vol. 32, No. 46, pp. 51, 53.

Owens, David; Facilities Planning & Relocation RSMeans, 1993, ISBN: 0-87629-281-3.

Larsen, Amy; Internet Goes to Work for Builders, Interweek, Nov. 16, 1998, Issue 741.

Primavera Systems Delivers Expedition Express, Business Wire, Feb. 23, 1999.

Deckmyn, Dominique; San Francisco Manages $45M Project Via Web-Based Service, Computerworld, Aug. 9, 1999, vol. 33, No. 32, p. 14.

Seibert, Paul; Facilities Planning & Design for Financial Institutions Bankline Publications, 1996, ISBN: 1-55738-780-X.

Mosig, Richard; Software Review: The Construction Project Manager Cost Engineering, Jan. 1996, vol. 38, No. 1, pp. 7-8.

Hernandez, Tomas et al.; Software Solutions Building Design & Construction, Nov. 1999, vol. 40, No. 11, pp. 38-40.

Taylor; Telecommunications Demand Analysis in Transition, Proceedings of the 31st Hawaii International Conference on System Sciences, vol. 5, Jan. 6-9, 1998, pp. 409-415.

Cotts, David; The Facility Management Handbook Second Edition AMACM, 1998, ISBN: 0-8144-030-8.

* cited by examiner

METHODS AND SYSTEMS FOR MANAGING SUCCESSFUL COMPLETION OF A NETWORK OF PROCESSES

CROSS REFERENCE TO RELATED APPLICATIONS

This application claims the benefit of U.S. Provisional Application Ser. No. 60/531,741, filed by Simon Bowie-Briton on Dec. 22, 2003 and entitled "Methods and Systems For Managing Successful Completion of a Network of Processes", which is incorporated herein by reference.

FIELD OF THE INVENTION

The present invention relates generally to data processing systems, and, more particularly, to methods and systems for managing successful completion of a network of processes.

BACKGROUND OF THE INVENTION

A well known difficulty in data processing involves the occurrence of a system failure while a transaction is being processed. For example, a transaction may involve the steps necessary for transferring $100 from a customer's savings account to the customer's checking account. Suppose the $100 was deducted from the customer's savings account, then a system failure occurred before the amount was added to the customer's checking account. The customer's account information would be in error.

There are various conventional techniques to deal with this problem. A very common solution is to employ what is known as a two-phase commit. In such a protocol, the transaction is designated by a "Begin Transaction" operation. The transaction ends with either a "Commit" operation or a "Rollback" operation. The Commit is used to signal a successful completion of the transaction. The Rollback is used to signal that the transaction was unsuccessful. When a Commit is received, usually a database management system will then write the results to persistent storage (e.g., to DASD).

Although the two-phase commit is often useful, there are certain drawbacks. One major disadvantage is the overhead involved. Furthermore, this approach is not suitable in every processing environment. For instance, when executing a network of processes in which a graph of processing nodes can be dynamically changed, and where no a priori knowledge of the graph structure exists, it can be difficult using such an approach to even know when successful completion of the network has occurred.

SUMMARY OF THE INVENTION

The present invention involves methods and systems for managing successful completion of a network of processes. The network of processes can be represented as a graph. In this representation, the nodes of the graph represent the processes, and the edges of the graph represent events associated with the processes. Processing starts at the root node, and is based on the result of an initially unknown graph. When an event is to be produced or consumed, a message to that effect is transmitted to a component called a Q-Manager. Using the messages, which are received in event order, the Q-Manager keeps track of the state of the graph, and determines when successful completion of the processing has occurred. Once this occurs, the Q-Manager sends a notification indicating completion of the network.

These and other aspects, features and advantages of the present invention will become apparent from the following detailed description of preferred embodiments, which is to be read in connection with the accompanying drawings.

DESCRIPTION OF PREFERRED EMBODIMENTS

It is to be understood that all program code and data used to implement the inventive methods reside on computer readable media and run on one or more computer systems including standard computer components and operating systems such as UNIX, as known in the art. Furthermore the invention can be implemented on a standalone computer, a client computer communicating with a server computer, or the software components necessary to implement the inventive methods can be distributed among computers on a network such as an intranet or on the Internet. Although the following examples describe the inventive methods implemented in the Java programming language, it is to be understood that the inventive methods can be performed by software written in other programming languages as known in the art, including, but not limited to, languages such as C, C++, or J2EE.

The present invention involves a method for managing successful completion of a network of processes. The network of processes may be represented as a graph, preferably a directed acyclic graph (DAG). In this representation, the nodes of the graph represent the processes, and the edges of the graph represent events associated with the processes. In general, the topology of the final graph will be unknown prior to completion. Processes may be created and deleted dynamically. Processing will successfully complete only when no more processes are to be created (when every process node is a leaf node). In general, an important aspect of the invention is to determine that processing has completed successfully, and to provide a notification message to this effect. Once the notification message is received, results may then be written to persistent storage.

Figure 1:
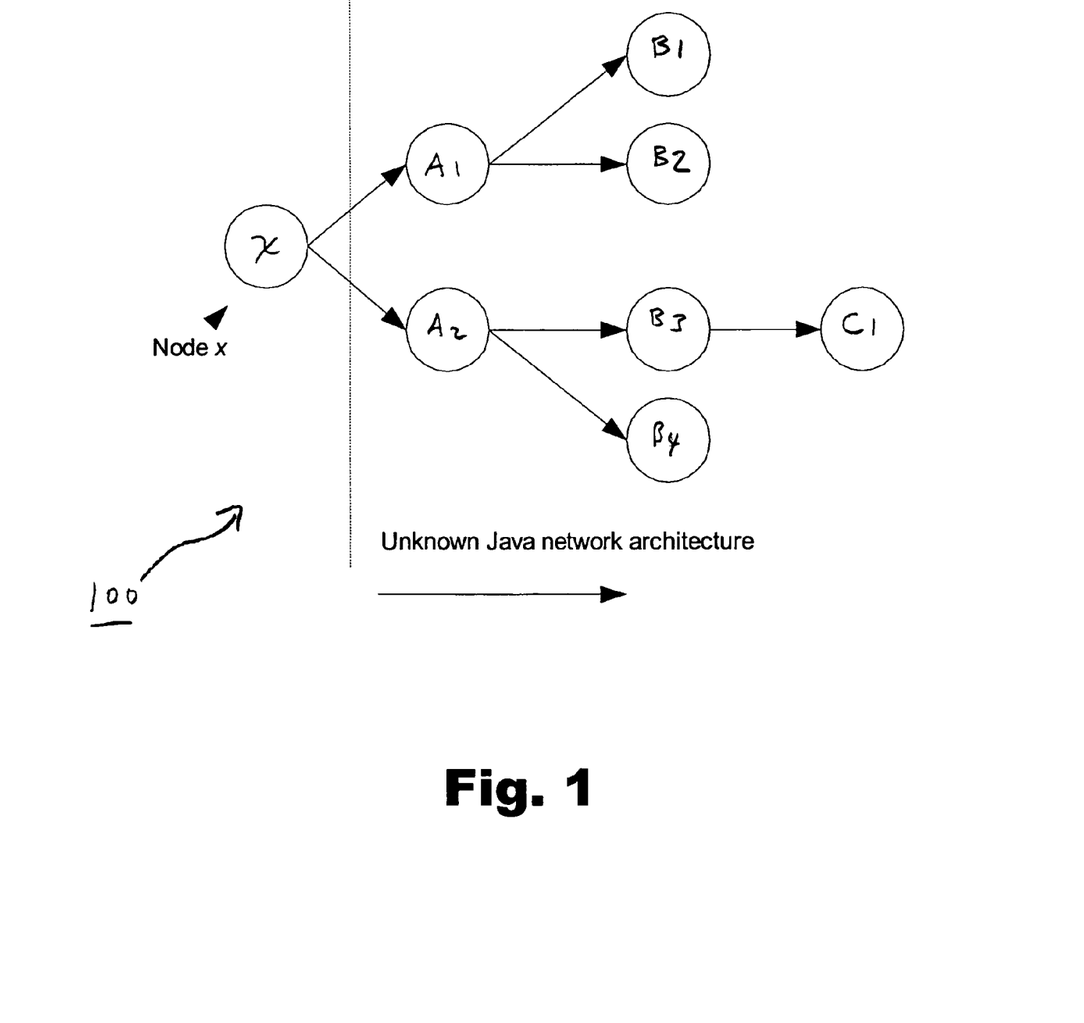
FIG. 1 illustrates an exemplary Java network architecture.

FIG. 1 illustrates an exemplary Java network architecture 100. This network architecture will now be described with respect to a practical application, but it is to be appreciated that many other such applications are possible.

Consider a financial application in which a process X is used to effect purchase of shares of stock. Suppose that a market order for 5,000 shares is received Process X might be used to purchase the shares on two different stock exchanges where the stock trades. Let us assume that the process X spawns a process A1 to purchase 3,000 shares on a first exchange and a process A2 to purchase 2,000 shares on a second exchange. Let us further assume that orders will be filled as shares become available. So, at different times $t_1$ and $t_2$, processes B1 and B2, might be created to purchase 1,000 and 2,000 shares, respectively. Likewise, at times $t_3$ and $t_4$, processes B3 and B4 might be created to each purchase 1,000 shares. Perhaps the process B3 is unable to purchase the full 1,000 shares as requested; process B3 might then spawn a process C1 to purchase the remainder. The resulting graph is shown in FIG. 1.

As can be seen from the above example, processing is based on the result of an initially unknown distributed graph (i.e., a network) of other processes. In addition, it is to be appreciated that one or more of these additional processes may be running in a different thread. Because of the nature of this processing environment, it is evident that determining successful completion of the network can be difficult. A reliable mechanism for determining that the network has finished is needed.

Figure 2:
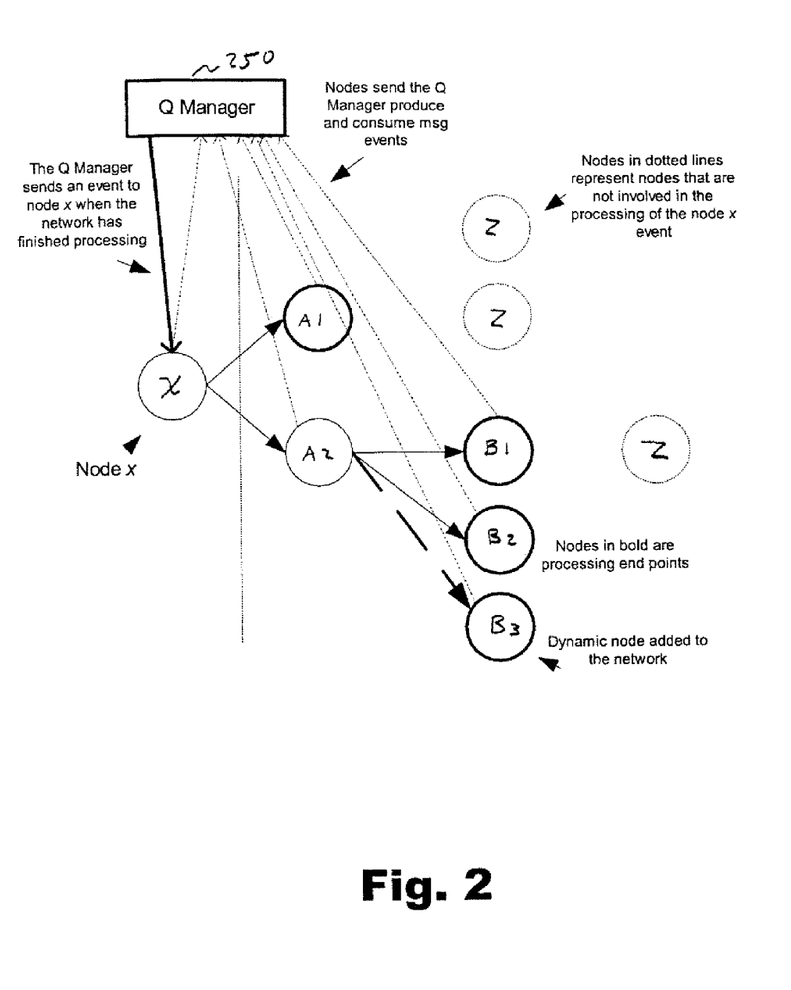
FIG. 2 illustrates an exemplary Q-Manager for managing successful completion of a network of processes.

FIG. 2 illustrates an exemplary Q-Manager 250 for managing successful completion of a network of processes. The Q-Manager 250 records the processing state of the network. Once the network has completed processing, the Q-Manager 250 will notify the root node that the network has finished processing. To allow the Q-Manager 250 to work out when processing has completed, a process of "node discovery" is required throughout the processing of events in the network graph. This means that when the network reads (consumes) and then creates (produces) new events to other processes in the network, the Q-Manager 250 is told about these actions. The method also allows the graph of processing nodes to be dynamically changed and will adapt to changes as they happen. No a priori knowledge of the graph is ever required by the root node.

In operation, the Q-Manager 250 maintains a list of active processes (nodes), and the list is updated to reflect the current state of the network. That is, as events are produced, the Q-Manager 250 receives messages that the list is to be updated to reflect the creation of the new processes. Conversely, as events are consumed, the Q-Manager 250 receives messages that the list is to be updated to reflect the deletion of certain nodes in the list. It is to be appreciated that various types of data structures may be used to implement the list of active processes, including an array, a linked-list, a bitmap, a table, etc. For purposes of maintaining the list, it may be desirable to provide a unique identifier for each of the active processes in the list.

Figure 3:
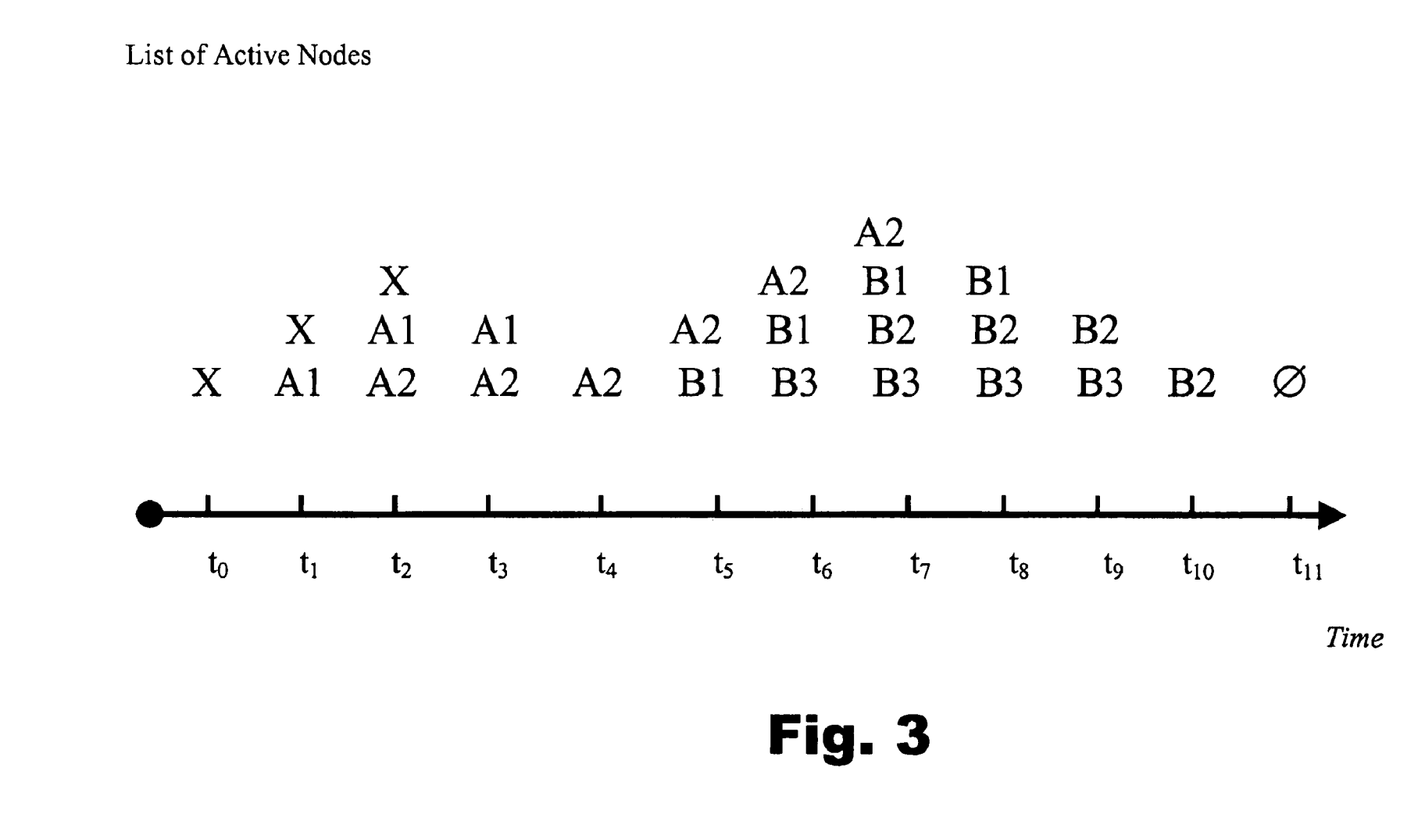
FIG. 3 illustrates changes over time to an exemplary list of active processes for the network of FIG. 2.

Initially, the Q-Manager 250 would receive a message indicating that a network was about to be created. The Q-Manager 250 would then allocate a new list for the network, and write an entry in the list for the root node (e.g., process X). FIG. 3 shows how the list of active processes for the network of FIG. 2 might change over time. At time $t_0$, the list would only include an entry for the process X. Preferably, messages received by the Q-Manager 250 would be sent by the processes themselves at or prior to production of events.

At time $t_1$, the Q-Manager 250 might receive a message from the process X indicating the creation of a process A1. The list at time $t_1$ would then be updated by adding an entry for process A1. Then, at time $t_2$, the Q-Manager 250 might receive a message from the process X that a process A2 was to be created. The list would be updated by adding an entry for the process A2. Then, at time $t_3$, the Q-Manager 250 might receive a message from the process X that the process X was completed. The list would be updated by deleting the entry for the process X.

Next, at time $t_4$, the Q-Manager 250 might receive a message from the process A1 that the process A1 was completed. The list would then be updated by a deleting the entry for process A1. At time $t_5$, the Q-Manager 250 might receive a message from the process A2 that a process B1 was to be created. The list would then be updated by adding an entry for the process B1. At time $t_6$, the Q-Manager 250 might receive a message from the process A2 that a process B3 was to be created. The list would then be updated by adding an entry for the process B3. At time $t_7$, the Q-Manager 250 might receive a message from the process A2 that a process B2 was to be created. The list would then be updated by adding an entry for the process B2.

Next, at time $t_8$, the Q-Manager 250 might receive a message from the process A2 that the process A2 was completed. The list would then be updated by deleting the entry for process A2. At time $t_9$, the Q-Manager 250 might receive a message from the process B1 that the process B1 was completed. The list would then be updated by deleting the entry for process B1. At time $t_{10}$, the Q-Manager 250 might receive a message from the process B3 that the process B3 was completed. The list would then be updated by deleting the entry for process B3. Finally, at time $t_{11}$, the Q-Manager 250 might receive a message from the process B2 that the process B2 was completed. The list would then be updated by deleting the entry for the process B2. At this point, the list would be empty.

Once the list becomes empty, the Q-Manager 250 then would then generate a message to signal successful completion of processing. Preferably, the Q-Manager 250 would send the notification message to the root node (process X). At this point, it would be safe to save result information to persistent storage (e.g., to a disk storage device).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for managing successful completion of a network of processes, comprising the steps of:
   (a) receiving a message indicative of the creation of an initiating process of the network of processes by an automated persistent software process (Q-Manager);
   (b) creating a list of active processes in the network in response to step (a) by the Q-Manager, the list having the structure of a directed acyclic graph, wherein the plurality of processes are represented as nodes of the graph and wherein events associated with the plurality of processes are represented as edges of the graph;
   (c) inserting a node representing the initiating process as the root of the graph (list);
   (d) receiving at least one message indicative of either creation or deletion of at least one of the processes;
   (e) updating the list of active processes in the network based on the received at least one message list;
   (f) sending a notification message indicating completion of the network of processes if the list becomes empty.

2. The method of claim 1, wherein the notification message is sent to the initiating process.

3. The method of claim 1, wherein result information is written to persistent storage after the notification message is received.

4. The method of claim 1, wherein the step of updating the list includes adding to the list information identifying a process to be created.

5. The method of claim 1, wherein the step of updating the list includes deleting from the list information identifying a process to be deleted.

6. The method of claim 1, wherein at least one of the processes is executed in a thread different from a thread used to execute another of the processes.

7. The method of claim 1, wherein the received messages are received in event order.

8. A system for managing successful completion of a network of processes, comprising:

a processor configured to process a list of active processes, the list having the structure of a directed acyclic graph, wherein the plurality of processes are represented as nodes of the graph and wherein events associated with the plurality of processes are represented as edges of the graph, the processor being configured to create an automated persistent software process called a Q-Manager for receiving a message indicative of the creation of an initiating process of the network of processes inserting, for inserting a node representing the initiating process as the root of the graph (list), for keeping track of the state of the network of processes, wherein the Q-Manager updates the list of active processes to reflect the state of the network of processes, and sends a notification message when processing is determined to have completed.

9. The system of claim 8, wherein processing is determined to have completed when the list of active processes is empty.

10. The system of claim 8, wherein the notification message is sent to the initiating process.

11. The system of claim 8, wherein the Q-Manager receives messages indicating whether events are created or consumed.

12. The system of claim 11, wherein the received messages are received in event order.

13. A program storage device readable by a machine, tangibly embodying a program of instructions executable on the machine to perform method steps for managing successful completion of a network of processes, the method steps comprising:

(a) receiving a message indicative of the creation of an initiating process of the network of processes by an automated persistent software process (Q-Manager);

(b) creating a list of active processes in the network in response to step (a) by the Q-Manager, the list having the structure of a directed acyclic graph, wherein the plurality of processes are represented as nodes of the graph and wherein events associated with the plurality of processes are represented as edges of the graph;

(c) inserting a node representing the initiating process as the root of the graph (list);

(d) receiving at least one message indicative of either creation or deletion of at least one of the processes;

(e) updating the list of active processes in the network based on the received at least one message list;

(f) sending a notification message indicating completion of the network of processes if the list becomes empty.

* * * * *